(12) United States Patent
Grubisic et al.

(10) Patent No.: US 9,678,889 B2
(45) Date of Patent: Jun. 13, 2017

(54) ADDRESS TRANSLATION IN A DATA PROCESSING APPARATUS

(71) Applicant: ARM Limited, Cambridge (GB)

(72) Inventors: Roko Grubisic, Cambridge (GB); Andrew Burdass, Cambridge (GB); Daren Croxford, Cambridge (GB); Isidoros Sideris, Cambridge (GB)

(73) Assignee: ARM Limited, Cambridge (GB)

(*) Notice: Subject to any disclaimer, the term of this patent is extended or adjusted under 35 U.S.C. 154(b) by 227 days.

(21) Appl. No.: 14/579,483

(22) Filed: Dec. 22, 2014

(65) Prior Publication Data

US 2015/0178220 A1 Jun. 25, 2015

(30) Foreign Application Priority Data

Dec. 23, 2013 (GR) .............................. 20130100707

(51) Int. Cl.
*G06F 12/00* (2006.01)
*G06F 12/1027* (2016.01)

(52) U.S. Cl.
CPC .... *G06F 12/1027* (2013.01); *G06F 2212/304* (2013.01); *Y02B 60/1225* (2013.01)

(58) Field of Classification Search
CPC .......... G06F 12/1027; G06F 2212/304; Y02B 60/1225
USPC ....................................................... 711/202
See application file for complete search history.

(56) References Cited

U.S. PATENT DOCUMENTS

| 4,682,281 A | 7/1987 | Woffinden et al. |
| 5,278,961 A | 1/1994 | Mueller |
| 5,301,298 A | 4/1994 | Kagan et al. |
| (Continued) | | |

FOREIGN PATENT DOCUMENTS

| CN | 100377117 | 3/2008 |
| EP | 0 704 805 | 4/1996 |
| (Continued) | | |

OTHER PUBLICATIONS

Search Report for GR 20130100707 with translation, dated Mar. 10, 2015, 2 pages.
(Continued)

*Primary Examiner* — Matthew Bradley
(74) *Attorney, Agent, or Firm* — Nixon & Vanderhye P.C.

(57) ABSTRACT

Address translation circuitry and a method of operating such a translation circuitry are provided. The address translation circuitry is configured to receive a first address used in a first addressing system and to translate it into a second address used in a second addressing system. Translation pipeline circuitry has plural pipeline stages configured to translate the first address into the second address over the course of the plural pipeline stages. Address comparison circuitry is configured to identify an address match condition when a received first address at least partially matches a previously received first address. Insertion circuitry is configured to determine a stage of progress of the previously received first address in the plural pipeline stages and to cause content of the stage of progress of the previously received first address to be unchanged at a next pipeline cycle when the address comparison circuitry identifies the address match condition.

19 Claims, 7 Drawing Sheets

(56) References Cited

U.S. PATENT DOCUMENTS

2004/0044870 A1* 3/2004 Pawlowski ......... G06F 12/0207
711/169
2006/0090034 A1 4/2006 Ishihara et al.
2009/0106523 A1 4/2009 Steiss

FOREIGN PATENT DOCUMENTS

JP S5894183 6/1983
WO WO 88/04449 6/1988

OTHER PUBLICATIONS

Search Report for GB 1410322.0, dated Dec. 9, 2014, 3 pages.
Citron, D. et al., "Hardware Memoization of Mathematical and Trigonometric Functions", (Mar. 26, 2000), 31 pages.
Ghose, K. et al., "Reducing Power in Superscalar Processor Caches Using Subbanking, Multiple Line Buffers and Bit-Line Segmentation", National Science Foundation, (1999), 6 pages.
Ma, A. et al., "Way Memoization to Reduce Fetch Energy in Instruction Caches", (2001), 8 pages.

* cited by examiner

ADDRESS TRANSLATION IN A DATA PROCESSING APPARATUS

CROSS REFERENCE TO RELATED APPLICATION

This application claims priority to GR Application No. 20130100707, filed on Dec. 23, 2013, the entire content of which is incorporated herein by reference.

TECHNICAL FIELD

The present disclosure relates to the field of data processing. More particularly, it relates to the translation of an address used in one addressing system into another address used in another addressing system.

BACKGROUND

It is known to provide address translation circuitry configured to receive a first address in a first addressing system and to translate it into a second address in a second addressing system. For example this may involve receiving a virtual address from a master device and to translate the virtual address into a physical address used in a memory system to which the master device requires access. Such address translation circuitry may for example be provided in a memory management unit (MMU) comprising an MMU translation lookaside buffer (TLB) and potentially a number of satellite μTLBs. Contemporary high-end processor cores, such as graphics processing units (GPUs) and application central processing units (CPUs) are often implemented with a distributed MMU, comprising a central μTLB and several satellite μTLBs. Indeed, in a multi-core device, even more μTLBs are often provided.

Even though a distributed MMU will generally not use a significant amount of power in the context of the power consumption of the whole chip on which it is found, the absolute power dissipated performing address translations is non-trivial. Furthermore, such address translation circuitry may often be provided in a pipelined format, which may bring efficiencies when the pipeline is relatively full, but nevertheless has an inherent latency, due to the number of pipelined stages, which can be a disadvantage.

It is known to implement "memoization" techniques in which a memo table is provided in which previously seen address translation are stored to enable a short cut to be taken to provided that address translations. A similar technique involves the provision of a line buffer performing a similar function. If such a memo table or line buffer is provided to act as a variety of "single-line L0" for a cache, the whole cache can be bypassed on a hit, but this is only possible when there is some sort of arbitration provided to determine where the response has come from (line buffer or cache pipeline), which may require the cache pipeline to be stallable which is undesirable for performance reasons. Also, such techniques do not naturally preserve the ordering of operations which can be a problem in some applications and would require additional logic and buffering to work. Furthermore, in the highly space-constrained environment of a contemporary on-chip device, the provision of an additional line buffer or memo table is disadvantageous because of the on-chip area which it consumes.

Some previous works dealing with "memoization" and line buffer techniques are: "Hardware Memoization of Mathematical and Trigonometric Functions", D. Citron and D. Feitelson, School of Computer Science and Engineering, The Hebrew University of Jerusalem, 26 Mar. 2000; "Way Memoization to Reduce Fetch Energy in Instruction Caches", A. Ma, M. Zhang and K. Asanovic, ISCA Workshop on Complexity Effective Design, 2001, MIT Laboratory for Computer Science; and "Reducing Power in Superscalar Processor Caches using Subbanking, Multiple Line Buffers and Bit-Line Segmentation", K. Ghose and M. Kamble, International Symposium on Low Power Electronics and Design, 1999, pp. 70-75.

It would be desirable to provide address translation circuitry which improves on the prior art.

SUMMARY

Viewed from a first aspect there is provided address translation circuitry configured to receive a first address used in a first addressing system and to translate the first address into a second address used in a second addressing system, wherein the address translation circuitry comprises:

translation pipeline circuitry comprising plural pipeline stages, the plural pipeline stages configured to translate the first address into the second address over the course of the plural pipeline stages;

address comparison circuitry configured to identify an address match condition when a received first address at least partially matches a previously received first address; and insertion circuitry configured to determine a stage of progress of the previously received first address in the plural pipeline stages and to cause content of the stage of progress of the previously received first address to be unchanged at a next pipeline cycle when the address comparison circuitry identifies the address match condition.

Viewed from a second aspect there is provided address translation circuitry configured to receive a first address used in a first addressing system and to translate the first address into a second address used in a second addressing system, the address translation circuitry comprising:

means for translating the first address into the second address over the course of plural pipeline stages;

means for identifying an address match condition when a received first address at least partially matches a previously received first address;

means for determining a stage of progress of the previously received first address in the plural pipeline stages; and means for causing the content of the stage of progress of the previously received first address to be unchanged at a next pipeline cycle when the address match condition is identified.

Viewed from a third aspect there is provided a method of translating a first address used in a first addressing system into a second address used in a second addressing system, the method comprising the steps of:

translating the first address into the second address over the course of plural pipeline stages;

identifying an address match condition when a received first address at least partially matches a previously received first address;

determining a stage of progress of the previously received first address in the plural pipeline stages; and causing the content of the stage of progress of the previously received first address to be unchanged at a next pipeline cycle when the address match condition is identified.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
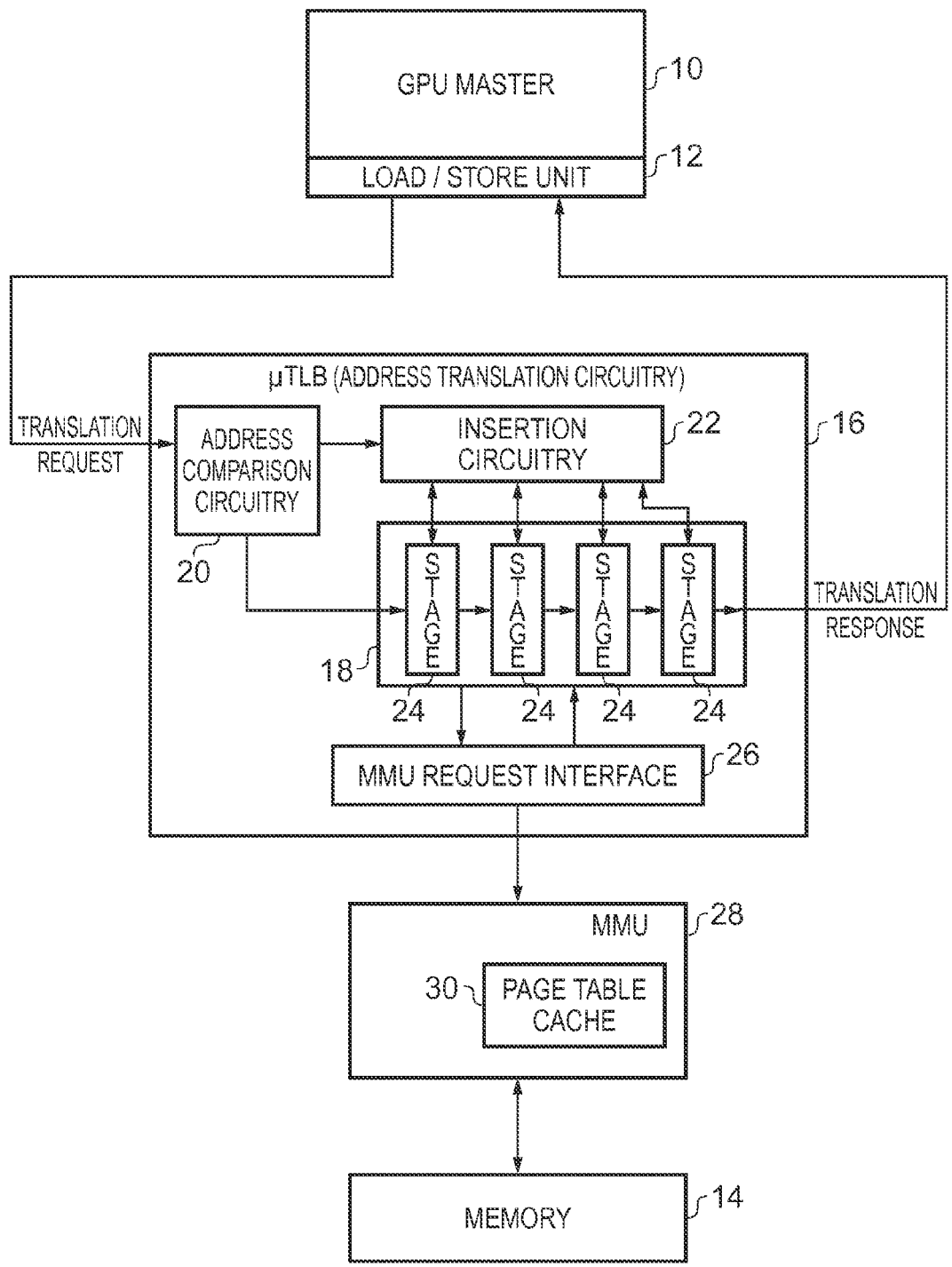
FIG. 1 schematically illustrates a data processing system comprising address translation circuitry in one embodiment.

Address translation circuitry is configured to receive a first address used in a first addressing system and to translate the first address into a second address used in a second addressing system, wherein the address translation circuitry comprises:

translation pipeline circuitry comprising plural pipeline stages, the plural pipeline stages configured to translate the first address into the second address over the course of the plural pipeline stages;

address comparison circuitry configured to identify an address match condition when a received first address at least partially matches a previously received first address; and insertion circuitry configured to determine a stage of progress of the previously received first address in the plural pipeline stages and to cause content of the stage of progress of the previously received first address to be unchanged at a next pipeline cycle when the address comparison circuitry identifies the address match condition.

The present techniques recognise that in address translation circuitry which comprises plural pipeline stages which perform an address translation, performance benefit may be gained by identifying if a received address has been previously handled by the address translation circuitry. More particularity, the present techniques recognise the performance benefits which may be gained when it can be identified that a received address at least partially matches the previously received address, i.e. the address which immediately preceded the received address. This may be referred to as a "back-to-back" condition. The "match" that is identified between the received first address and the previously received first address could be a full match of the entirety of each address, but a particularly useful variant involves the matching being determined between the "page addresses" (higher order bits) of each address.

It should be appreciated that the addresses which the address translation circuitry is configured to translate from and to could take a number of forms. For example the received address may be a virtual address used in a memory addressing system of a master device and the translated address may be physical address used in an address used in an addressing system of a physical memory device to which the master device seeks access. However other forms of address are also envisaged such as intermediate physical or virtual addresses, which may represent an intermediate translation stage between a virtual and a physical address, such as may for example be employed in virtualization systems. The address translation performed may then be between a virtual address and an intermediate address, or between an intermediate address and a physical address.

Instead of relying on prior art techniques such as memoization or line buffers, the present techniques enable the performance benefit to be derived from the reuse of a translation performed for the previously received address with only a very limited amount of additional circuitry needing to be provided. In particular, this additional circuitry—insertion circuitry—is configured to identify where that previously received address has reached in the plural pipeline stages and causes the content of that stage to be unchanged at a next pipeline cycle. Accordingly, various performance benefits arise.

Firstly, since the received address and the previously received address are the same this effectively causes the received address to be automatically advanced through the pipeline stages to the pipeline stage which immediately follows that which the previously received address has reached, thus reducing the latency associated with the address translation process for the received address. Indeed, where the translation of the previously received address has already exited the translation pipeline, the content of the last stage of the pipeline can immediately be output as the translation, enabling a single-cycle translation to be performed. Secondly, this "bubble collapsing" is achieved whilst maintaining the ordering of the translation request and does not require the pipeline to be stalled. Thirdly, power saving can be achieved by virtue of the earlier stages in the pipeline which are not used. Fourthly, the additional circuitry associated with the insertion circuitry is rather limited and therefore valuable on-chip area is not wasted (in particular when compared to prior art techniques such as involve the use of a separate line buffer or memo table). Fifthly, prior art techniques such as line buffers have been configured to only store valid lines whereas the present techniques work whether a hit or a miss occurs during the translation process performed by the translation pipeline circuitry. This thus means that if a request misses in a cache provided as part of the translation pipeline circuitry (and therefore will have to be replayed, say) the next request sitting in the same cache line won't have to perform the pipeline stages preceding where this occurred. This can be potentially beneficial in the context of streaming caches that replay misses, in particular if the misses are replayed speculatively and many related back-to-back requests can take place whilst waiting for a line fill. This approach may especially useful for streaming TLB caches such a those that are provided in GPUs.

In examining some benchmark tests on a GPU, the present inventors have found that a surprisingly large number of translation requests are in fact back-to-back requests (e.g. 50-89% of requests fall in the same page as the previous request, depending on the benchmark) and furthermore that it isn't likely that the pipeline will be full in various caches so latency improvements also result according to the present techniques. Further, in the best case scenario of an empty pipeline and back-to-back translation requests these have been found to occur for around 10% of translation requests in some benchmarks. Power consumption benefits are thus derived from the fact that the translation can be performed in single cycle using virtually no dynamic power (including clock tree power) in embodiments in which particular power saving steps (e.g. clock gating are taken).

In some embodiments, each pipeline stage of the plural pipeline stages comprises a register configured to hold content which is subject to address translation processing for that pipeline stage, wherein the register is clock-gated in dependence on an enable signal for that pipeline stage, and wherein the insertion circuitry is configured to force the enable signal to clock-gate the register to be static in pipeline stages ordered after the stage of progress of the previously received first address when the address comparison circuitry identifies the address match condition.

Accordingly, in the situation where the received first, say virtual, address is able to be accelerated through the pipeline stages of the manner described above, the above mentioned power saving may be achieved by clock-gating registers in the pipeline stages which have been "leap-frogged", since there is no need for these registers to be active. Control of this is provided by the enable signal in each pipeline stage which determines whether the register in that pipeline stage is clock-gated or not. This enable signal may for example be propagated through the plural pipeline stages during the normal sequential operation of those pipeline stages, thus accompanying the content of the corresponding pipeline stage and indicating that it is valid. "Enabling" the corresponding register in this manner can for example configure the register such that the content of that register is allowed to be passed on to the next pipeline stage at the next pipeline cycle. This clock-gating of pipeline stages which do not need to be active thus saves dynamic power (e.g. clock tree power for pipeline registers and tags in full associative caches, cache RAM access power etc.).

In some embodiments, each pipeline stage of the plural pipeline stages is configured to propagate a valid signal, wherein said valid signal indicates that the content of that pipeline stage is valid, and wherein the insertion circuitry is configured determine the stage of progress of the previously received first address in the plural pipeline stages by finding a last pipeline stage where the valid signal is set as valid. This valid signal this enables a translation request passing through the pipeline to be correctly administered and tracked. Furthermore, and of particular benefit in the present context, this use of a valid signal in association with the valid content of the associated pipeline stage provides the insertion circuitry with a expedient method for identifying the last valid transaction in the pipeline, which must therefore belong to the previously received first address when the address match condition has been identified by the address comparison circuitry.

In some embodiments where a valid signal is used in this manner, the insertion circuitry is configured to force the valid signal to be valid in the pipeline stage ordered immediately after the stage of progress of the previously received first address when the address comparison circuitry identifies the address match condition. Hence, by forcing the pipeline stage corresponding to the previously received first address request to have an associated asserted valid signal, this then means at the next pipeline cycle this valid signal will be propagated to the following pipeline stage (i.e. the stage where the previously received first address request was found) and thus the content of that stage will be reused at the next pipeline cycle, i.e. now corresponding to the received first address (i.e. the latter address in the back-to-back pair).

In some embodiments the address comparison circuitry is configured to identify the address match condition with reference to an indication of the previously received first address stored in a first pipeline stage of the plural pipeline stages. Whilst it would be possible for the address comparison circuitry to store an explicit indication of the most recently seen address, this has the disadvantage of the additional area consumed by such storage. Further, given that the first address is first received by the first pipeline stage of the plural pipeline stages, an indication of the previously received first address is available in the first pipeline stage of the plural pipeline stages until another address overwrites it. Accordingly, the address comparison can be advantageously implemented without requiring additional storage to be provided.

In some embodiments the address translation circuitry further comprises a memory management unit request interface configured to receive request from a memory management unit. For example, the address translation circuitry may be provided as part of a TLB, which may operate independently of a memory management unit (MMU) because of the faster response which it may provide, but it may also operate association with (indeed ultimately as a slave to) the MMU master. In particular, the MMU may issue particular requests to the (TLB) address translation circuitry and there are a number of reasons why it may be advantageous for these requests to be handled via an interface, for example so that a number of requests received in relatively rapid succession can be correctly dealt with and administered whilst pending.

The address translation circuitry may however instead be provided as part of an MMU itself and in some embodiments the address translation circuitry forms part of a memory management unit and further comprises an interface configured to interact with a page table walk engine of the memory management unit. This similarly enables the address translation circuitry to correctly deal with and administer requests sent to and responses received from such a page table walk engine.

In some embodiments the memory management unit request interface comprises a first-in-first-out (FIFO) buffer configured to store pending requests received from the memory management unit. A FIFO buffer provides an expedient mechanism for administering a number of pending requests received from the memory management unit and in particular maintaining their order.

Whilst the address comparison circuitry may be configured to operate on every translation request it receives, in some embodiments the address comparison circuitry further comprises enable circuitry, the enable circuitry configured to suppress operation of the address comparison circuitry when a suppression condition is met. The present techniques recognise that there are a range of situations in which it may not be desirable for the address comparison circuitry to operate, either because the address translation circuitry is known to temporarily be unable to perform the address translation, or because this possibility merely exists. It is therefore advantageous in some situations, which may be characterised by the assertion of the suppression condition, for enable circuitry to temporarily suppress operation of the address comparison circuitry.

For example, in embodiments in which a memory management unit request interface is provided the address translation circuitry is configured such that the suppression condition is met when the request received from the memory management unit is at least one of: a linefill request; and an invalidation request. Either of these types of request from the memory management unit will result in at least some of the stored content of the address translation circuitry being invalidated and therefore the translation previously performed for the previously received first address cannot be relied upon to be correct for the received first address. In this situation it is then beneficial for the operation of the address comparison circuitry to be temporarily suppressed.

Similarly, in embodiments where the address translation circuitry forms part of a memory management unit, for the same reasons it is advantageous to configure the address translation circuitry such that the suppression condition is met when the memory management unit carries out at least one of a linefill request; and an invalidation request.

Furthermore, in embodiments where a memory management unit request interface comprises a FIFO buffer, the address translation circuitry may be configured such that the suppression condition is met when at least one of the following conditions is met: the memory management unit indicates that occupancy of the FIFO buffer has reached at least a predetermined threshold; and the translation pipeline circuitry indicates that at least a predetermined number of the plural pipeline stages are currently actively performing address translations. These particular conditions, especially in combination, mean that it cannot be guaranteed that a slot (entry) in the FIFO buffer will be granted, because the address translation circuitry is generally operating at close to full capacity, and it is therefore advantageous for the operation of the address comparison circuitry to be temporarily suppressed before the "acceleration techniques" such as those described herein are allowed to resume, to avoid for example the MMU request interface FIFO running out of available slots.

In most examples of address translation circuitry, in particular in the case of a TLB, it may not be required for the entirety of the first address to be translated, for example because a set of lower significance bits of the address corresponding to the smallest page size in the system will not be translated and only the higher significance bits of the address above that will be translated from a first to second (e.g. virtual to a physical) mapping. This further increases the benefit that may be gained from the present techniques since address translation requests do not need to be completely identical and therefore the opportunity for detecting back-to-back requests and reusing the result of the previous translation increases. Accordingly, in some embodiments the address translation circuitry comprises an address pipeline and a payload pipeline, wherein the address pipeline comprises the address translation circuitry, the translation pipeline circuitry, and the insertion circuitry, and an address portion of the first address is passed to the address pipeline and a payload portion of the first address is passed to the payload pipeline, wherein the payload portion of the virtual address is not changed by translation of the first address into a physical address. It should be noted that the address portion of the first address may not only comprise address information per se, but may for example additionally comprise further information such as an address space identifier and the request type (e.g. read/write/atomic/execute). Similarly the payload portion may not only comprise that the portion of the first address per se which is not changed by the translation process, but may additionally comprise identification information (e.g. load/store unit internal IDs etc.). A particular advantage of dividing the address translation circuitry into two parallel pipelines in this manner is that the address pipeline and the payload pipeline may be differently configured in dependence on the particular requirements of each. In particular, given that the payload portion of a first address is not changed by passing through the payload pipeline, the payload pipeline can be configured in an advantageously simple manner.

For example, in some embodiments the payload pipeline comprises registers arranged as a FIFO structure. A pointer based FIFO structure of registers presents various advantages, in particular that the "propagation" of entries through the FIFO can be very efficiently performed by merely updating a read and a write pointer. Furthermore, the structure does not need to be enabled on a read and a multiplexer can simply select the appropriate entry to read out.

In some embodiments, the payload pipeline comprises a bypass path configured to pass the payload portion directly to an output of the payload pipeline when the payload pipeline is currently empty. Accordingly, this enables a direct single pipeline cycle pass-through of the payload portion without performing a write within the payload pipeline when the pipeline is empty. This further improves the latency reduction of the address translation circuitry.

In some embodiments the plural pipeline stages are configured to seek to translate the first address into the second address with reference to at least one cache storage configured to store indications of previously performed first to second address translations, and further comprising a replay buffer configured to temporarily hold an indication of the first address before returning it to an input of the address translation circuitry for translation of the first address into the second address to be reattempted when a cache look up in the at least one cache storage results in a cache miss. In the context of the present techniques, the provision of a reply buffer may be particular advantageous for address translation circuitry which is expected to encounter frequent (or at least a sequence of) cache misses, because the replaying of requests which are handled by the replay buffer will be likely to result in the address match condition being met. Furthermore, the present techniques, which allow a matching subsequent address translation request to skip one or more pipeline stages in the address translation circuitry, may be particularly advantageous when a replay buffer is provided to allow the translation to be reattempted when a cache lookup in a cache storage results in a cache miss, because the present techniques work for both cache hits and misses. If a request misses in cache and is replayed, the next request hitting in the same line (page or similar) won't have to attempt tag lookup etc. This is particularly useful for streaming caches such as those in GPUs, especially if the misses are replayed speculatively and repeated related back-to-back requests occur whilst waiting for a line fill.

In some embodiments the first address is accompanied by an indication of a request type of a corresponding memory access request and the plural pipeline stages are configured, if permission data associated with a translation of the first address into the second address indicate that the translation is not allowed for the request type, to seek to translate the first address into the second address, but not to pass the second address to an output of the address translation circuitry and to generate a fault response. Accordingly, in such a situation it is the particular permissions associated with the translation of the first address into the second address which has not allowed this translation to fully proceed. In this situation, it is then advantageous in the context of the present techniques to allow the translation process to proceed as far as possible as it can through the pipeline stages before the examination of the permission data indicates that the translation cannot be completed, because of the pre-population of the content of those pipeline stages that results. Accordingly, if this translation request is received again (for example after the permission data have been changed, more memory has been allocated, or so on), then the present techniques can benefit from that pre-population of the pipeline stages content and the potential exists for the reiterated translation request to correspond to a second request in a back-to-back pair and thus skip those pre-populated pipeline stages. It should be noted that the fault response may comprise both a response which replaces the usual transaction response generated by the address translation circuitry as well as a message, for example passed to an MMU indicating that a fault has occurred.

FIG. 1 schematically illustrates a data processing system in one embodiment. The processing system comprises a graphics processing unit (GPU master device 10 having an associated load/store unit 12, wherein the load/store unit 12 is configured to handle memory accesses on behalf of the GPU master 10. One particular aspect of handling these memory accesses, which is of particular relevance here, concerns the fact that the GPU master 10 handles memory locations in terms of virtual addresses, whilst the memory 14 to which the GPU master 10 seeks access handles memory locations in terms of physical addresses. For this reason, when the GPU master 10 wishes to access a particular memory location (whatever the type of access, e.g. read/write/atomic/execute) it is necessary for the load/store unit 12 to translate the virtual address given by the GPU master 10 into a physical address which the memory 14 can handle. The load/store unit 12 does not perform this address translation itself, but rather the GPU master 10 is provided with an associated micro-translation lookaside buffer (µTLB) 16, which is specifically configured to perform these address translations.

The µTLB 16 is configured to receive an address translation request (including a virtual address) and to generate a translation response which should include the translated physical address. It is however also possible for the translation response to indicate that, for some reason, the address translation could not be performed. The µTLB 16 essentially comprises a translation pipeline 18, address comparison circuitry 20 and insertion circuitry 22. The translation pipeline 18 consists of a number of pipeline stages 24 which are configured to perform various stages of the address translation process, such as performing cache lookups in tag and data RAMs, checking access permissions, and so on. The address comparison circuitry 20 is provided to compare a received virtual address in the translation request with a previously received virtual address in a previously translation request and to identify a match condition when those addresses match. In fact, the virtual addresses do not need to fully match, because this being a µTLB it is only necessary for an upper portion of the address to be translated into physical address format, whilst a lower portion of the address corresponding to the minimum page size in the data processing system is ignored and is left unamended. This will be described in more details below in particular with reference to FIGS. 3 and 4. When the address match condition is identified by the address comparison circuitry 20 it signals this fact to the insertion circuitry 22. The insertion circuitry 22 then causes the newly received address translation request to effectively be inserted at a pipeline stage 24 immediately after (i.e. to the left of the figure) the stage that the previously received translation request (comprising the previously virtual address which matched) had reached. This is because the address translation process performed by the pipeline stages 24 with respect to that previously received virtual address can be reused for the newly received virtual address thus saving both power consumption (by not activating the skipped pipeline stages) and reducing the latency associated with the address translation process for the received virtual address (by virtue of one or more pipeline stages having been leap-frogged). How this power saving and leap-frogging is achieved with be described in more detail below, in particular with reference to FIG. 3 and FIG. 6, but it is instructive to note already at this stage that a beneficial feature of this identification and "insertion" process performed by the insertion circuitry 22 is that data relating to the received virtual address does not need to be physically copied into the relevant pipeline stage, but rather the insertion circuitry 22 is configured to manipulate a validity signal which is propagated through the translation pipeline 18 from pipeline stage to pipeline stage such that the validity signal in the pipeline stage at which the translation request relating to the received virtual address should be "inserted" is forced into the "valid" state, with the result that the content of the preceding pipeline stage (i.e. one step to the right in the translation pipeline illustrated in FIG. 1) is reused at the next pipeline cycle when the translation request relating to the received virtual address effectively arrives at that pipeline stage. As such, the circuitry required to implement the insertion circuitry 22 is relatively modest and therefore the silicon area consumed is advantageously limited.

The µTLB 16 further comprises an MMU request interface 26 which is configured to buffer requests received from an MMU 28 in a manner in which will be described in more detail below with reference to FIG. 3. This MMU request interface 26 also handles requests and messaging passing from the µTLB 16 to the MMU 28. For example, the MMU 28 comprises a page table cache 30, and the µTLB 16 may issue page table requests to the MMU 28 when it encounters an address translation request for which the required data is not currently cached within the µTLB 16. The page table cache 30 within the MMU 28 is therefore only of limited size and alternatively (for example if the requested page table is also not present in the page table cache 30) the required page table data may be retrieved from the memory 14. There could of course be further cache levels between the MMU 28 and the memory 14, which are not illustrated here for brevity.

Figure 2:
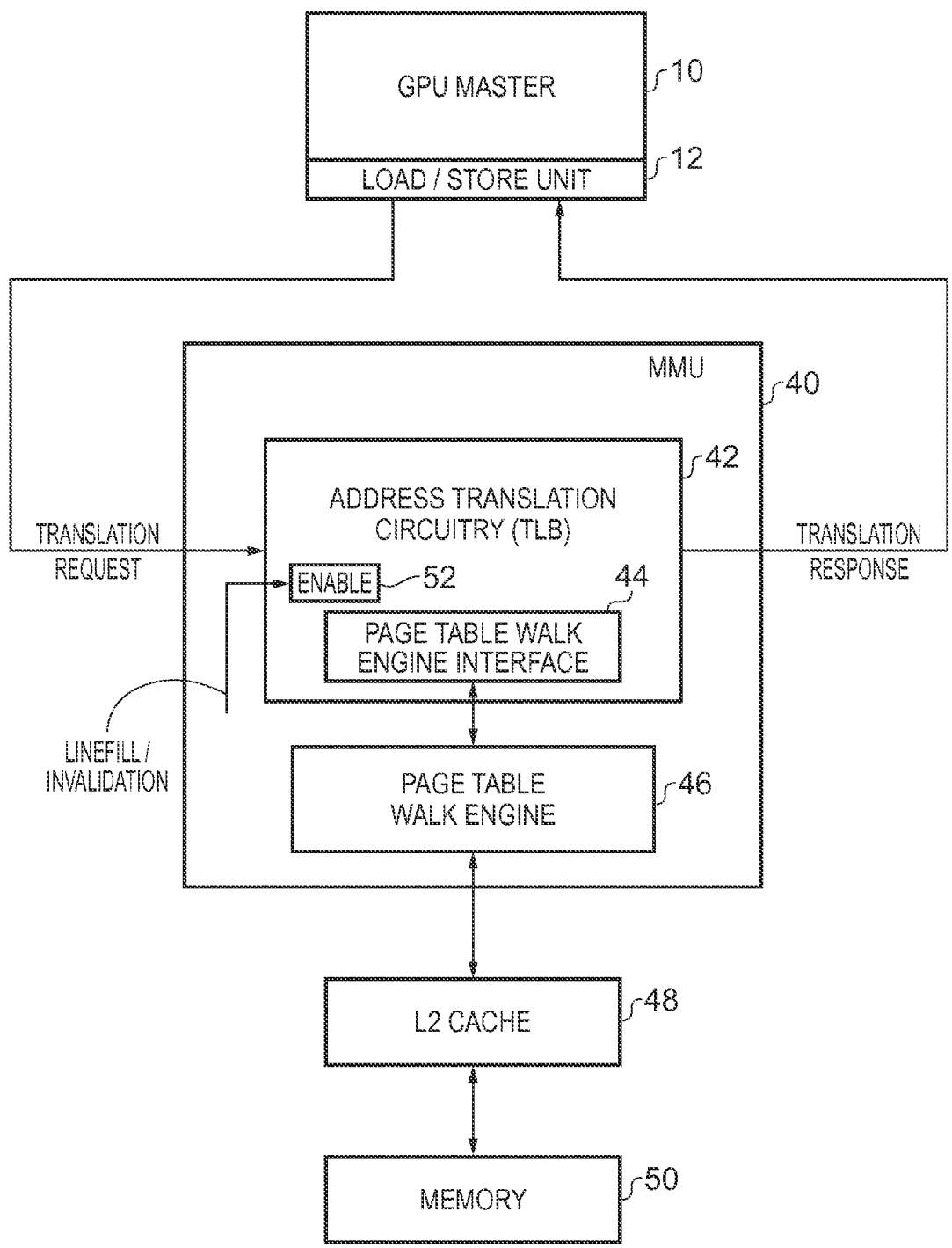
FIG. 2 schematically illustrates a data processing system comprising address translation circuitry in one embodiment.

FIG. 2 schematically illustrates an embodiment in which the same GPU master 10 and its associated load/store unit 12 as shown in FIG. 1 instead interact directly with an MMU 40 provided with a TLB (address translation circuitry) 42 configured to perform the required virtual to physical address translation. The content of the TLB 42 is essentially the same as that shown as the content of the µTLB 16 in FIG. 1, with the exception that the MMU request interface 26 has been replaced by a page table walk engine interface 44 which is configured to provide an interface to the page table walk engine 46 of the MMU 40. The page table walk engine 46 is configured to perform a page table walk in order to retrieve page table data from the memory hierarchy (i.e. in this embodiment either from the L2 cache 48 or beyond from the memory 50) in the event that the TLB 42 does not have the required address translation information locally cached. One further detail illustrated in FIG. 2, which will be discussed in more detail with respect to FIG. 3, is that the TLB 42 is provided with enable circuitry (logic) 52 which is configured to enable or disable the address comparison circuitry (not explicitly shown in FIG. 2) of the TLB 42. Normally the address comparison circuitry is enabled, but there are some situations in which it is advantageous for the address comparison circuitry to be disabled, such as when the MMU 40 performs a line fill operation or an invalidation, in which case it is recognised that the locally cached translation information deriving from a previous translation operation cannot be relied upon to provide accurate translation information for a next translation request and accordingly in such situations the enable circuitry 52 is configured to disable the address comparison circuitry.

Figure 3:
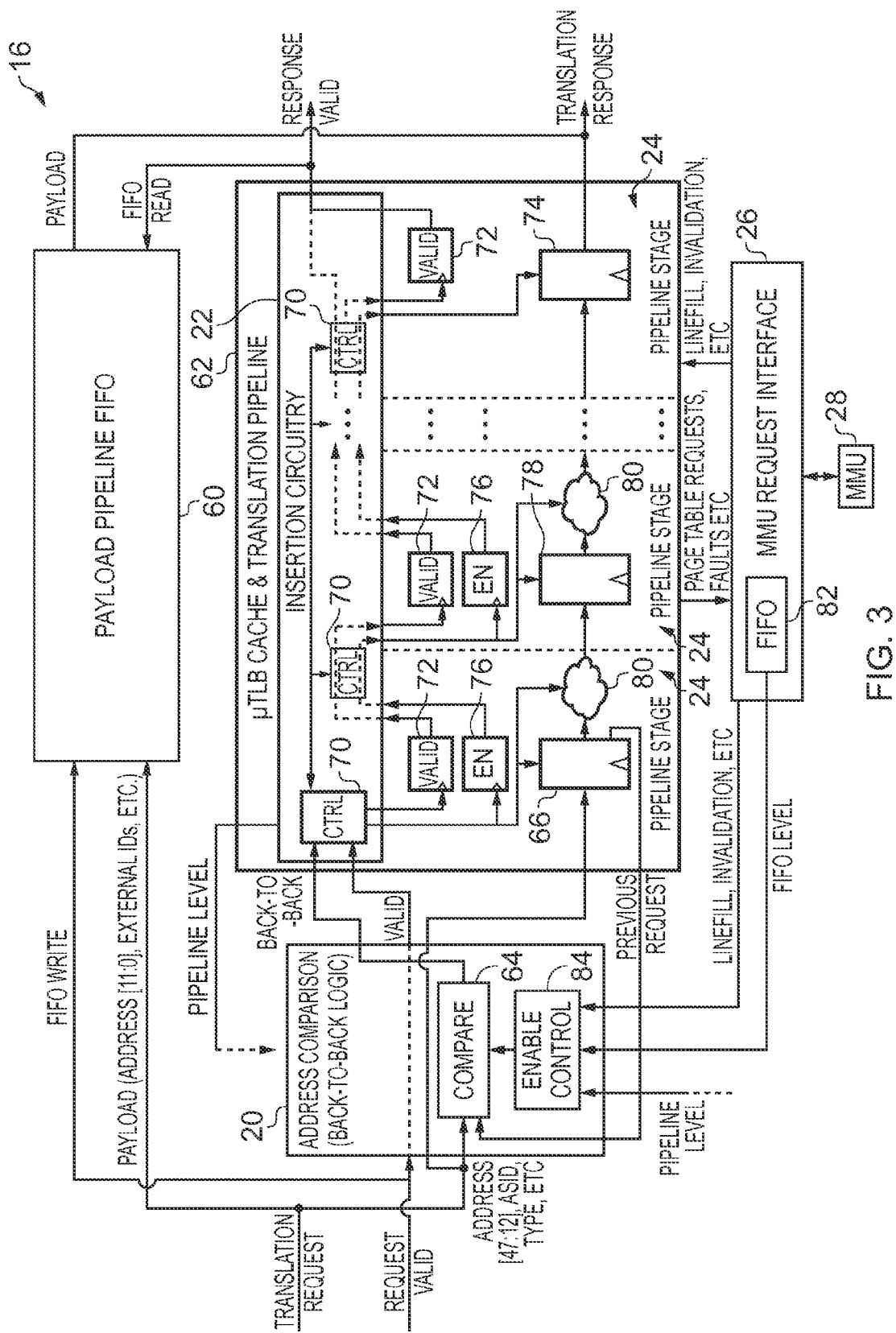
FIG. 3 schematically illustrates in more detail the address translation circuitry shown in FIG. 1.

FIG. 3 schematically illustrates in more detail the configuration of the µTLB (address translation circuitry) 16 of FIG. 1. When a translation request is received by the µTLB 16, it is in fact split into two portions namely a payload portion and an address portion, the payload portion being passed to a payload pipeline 60, whilst an address portion is passed to the address comparison circuitry 20 (also referred to as "back-to-back logic") and directly into the first pipeline stage 24 of an address pipeline 62 (also referred to as the µTLB cache and translation pipeline). In the embodiment illustrated in FIG. 3, the lower 12 bits (i.e. [11:01]) of the received virtual address form the payload portion of the address, whilst the upper 36 bits of the address (i.e. [47:12]) provide the address portion of the virtual address. The lower 12 bits forming the payload portion of the virtual address are not changed by the address translation because in this embodiment the data processing system has a minimum page size of 4 kB. It should further be noted that the full "payload" which enters the payload pipeline can also include other data items which may be passed through the µTLB unamended, such as external IDs for example belonging to the load/store unit 12. Similarly the address portion which enters the address pipeline 62 can also comprise additional information which may be useful for performing the address translation process such as an application specific ID (ASID, i.e. an address space identifier) and the request type (e.g. read/write/atomics/execute), etc. The payload pipeline 60 is described in more detail below with reference to FIG. 4, but it suffices to say at this point that the payload pipeline 60 can have a relatively simple structure, for example in this embodiment being a simple FIFO structure, due to the fact that no translation processing needs to be performed on this portion of the translation request. A translation request received by the µTLB is also accompanied by a "request valid" signal indicating that the translation request is valid and this request valid signal provides a FIFO write signal for the payload pipeline 60. Similarly, at an output of the µTLB, the translation response is accompanied by a "response valid" signal indicating that the translation response is valid, and this response valid signal also provides a FIFO read signal for the payload pipeline 16 to trigger a set of payload data to be read out from the payload pipeline FIFO for combination with the translated upper portion of the now physical address to form the translation response provided by the µTLB 16.

The upper address bits [47:12] received by the address comparison circuitry 20 are passed to a comparator 64 which is configured to compare these address bits with the corresponding address bits of a previously received virtual address and to identify a match condition when the two are the same. The required address bits from the previously received request are provided by a register 66 in the first pipeline stage 24 of the address pipeline 62. Accordingly, no further dedicated storage needs to be provided (for example within the address comparison circuitry 20), to store the address bits corresponding to the previous request. Regardless of where the previously received translation request has reached in its progress through the address pipeline 62, the content of the register 66 will still correspond to these address bits of the previously received virtual address since once a translation request has moved beyond this pipeline stage, the register 66 is clock-gated and therefore the content of the register 66 remains statically held and available for such later comparison.

When the comparator 64 identifies the address match condition it indicates this fact by the generation of the "back-to-back" signal which is passed to the insertion circuitry 22 of the address pipeline 62. Specifically, this back-to-back signal indicating that the upper portion of the address in the translation request matches the upper portion of the address in the previously received (i.e. most recently received) translation request is received in the insertion circuitry 22 by a distributed set of control circuitry 70. The control circuitry 70 also receives the "request valid" signal received by the µTLB 16 in association with the translation request. The distributed control circuitry 70 performs two central functions when the back-to-back signal is asserted by the comparator 64. The first of these is to identify the last (i.e. right-most in the figure) pipeline stage 24 at which the valid signal is currently asserted. The valid signal originally received (as the "request valid" signal) by the insertion circuitry 22 is propagated through the pipeline stages 24 to indicate the validity of a translation request which is passing through the sequence of pipeline stages and therefore indicates which pipeline stages are currently handling a part of the processing for a translation request. Hence, after the elapse of a pipeline cycle when the content of one pipeline stage is propagated on to the next pipeline stage, the valid signal held in a corresponding flop 72 in the respective pipeline stage is reset to indicate "invalid" (unless the valid signal from a preceding pipeline stage is propagated into that pipeline stage). Thus, having identified the last valid transaction the pipeline, the insertion circuitry 22 is configured to force the valid signal in the preceding pipeline stage (i.e. the value held in the valid flop 72 of the preceding pipeline stage) to indicate "valid". This then effectively inserts the translation request of the newly received translation request at that pipeline stage because in combination with the fact that the control circuitry 70 is configured to force an enable ("EN") signal also associated with each pipeline stage to be low for the pipeline stage in which the valid signal 72 has been forced to indicate valid (e.g. high), this means that at the next pipeline cycle no content from that pipeline stage will be transferred into the pipeline stage identified at the last pipeline cycle by the inversion circuitry 22 as the last valid transaction stage. Nevertheless the valid signal will be propagated and accordingly the content of that last valid transaction stage will be re-used in the following pipeline cycle thus providing the same pipeline content as if the latter translation request of the identified back-to-back pair had progressed through the pipeline stages immediately following the first translation request of the back-to-back pair.

This arrangement means that the latency associated with the address translation process for the latter translation request is advantageously reduced (by effectively skipping pipeline stages). It should be noted that if the insertion circuitry 22 (and in particular the control circuitry 70) determines that the pipeline is empty, i.e. there are no valid transactions in any of the pipeline stages, then the valid signal can be passed straight through the pipeline and the translation response immediately generated on the basis of the content of the last register 74 in the last (i.e. right-most in the figure) pipeline stage 24. In this best case scenario (in terms of the opportunity for latency reduction and power saving) a single cycle translation can therefore achieved. Note that the last (right-most) part of the control circuitry 70 is thus configured to be able to either pass a valid signal to the valid flop 72 of the last pipeline stage or directly to the "response valid" output of the µTLB 16.

As mentioned above, both a valid signal and an enable signal are propagated through the multiple pipeline stages (of which only three are explicitly shown, but the figure indicates that an arbitrary number of further pipelines stages may exist). Accordingly, each pipeline stage 24, other than the last pipeline stage, is provided an enable flop 76 which is configured to hold the enable signal value for that pipeline stage and to pass it on towards the next pipeline stage at each pipeline cycle change. Note that the last (right-most) pipeline stage does not have an enable flop, since there is no following pipeline stage for this signal to be passed into. Note that both the valid signal 72 and the enable signal 76 are passed from one pipeline stage to the next via the control circuitry 70, such that the control circuitry 70 can intervene to force one or both of these signals to a particular value instead of letting the normal signal propagation from one pipeline stage to the next to happen. Accordingly, during normal operation (i.e. when the back-to-back signal is not asserted), the control circuitry 70 does not intervene in the propagation of the valid and enable signals (of whatever value) from one pipeline stage to the next. However, when the back-to-back signal is asserted, the control circuitry 70 is configured as mentioned above to force the valid signal high (i.e. "valid") for the pipeline stage following (i.e. left of in the figure) the pipeline stage at which the last valid transaction in the pipeline has been found, as well as forcing the enable signal for that pipeline stage to be forced low (i.e. to disable). As mentioned above this then means that the content of that following pipeline stage is not transferred to the pipeline stage for which the match was found, and hence the content of the pipeline stage at which the match was found is reused at the next pipeline cycle (because the forced valid signal then arrives). Furthermore, the control circuitry 70 is configured to force the enable signal low in all pipeline stages preceding the pipeline stage at which the match was found, since there is no need for the content at any of those stages to be used or propagated in any of those pipeline stages. Note that the enable signal in the pipeline stages 24 is received by the corresponding register 66, 78, 74 for that pipeline stage, but is also received (in pipeline stages other than the final pipeline stage) by processing logic 80 provided in each of those pipeline stages. This processing logic 80 is configured to perform the various stages of the address translation process, such as tag lookups, data lookups, permission retrievals, and so on. Thus by clock-gating both the registers and any processing logic 80 in each pipeline stage on the basis of the enable signal the clock tree power associated with these components can be saved when they are not required to be active. Note that there is in fact no need for the control circuitry 70 to actively force the valid signal of stages following (i.e. left of) the pipeline stage in which the match was found since by definition the pipeline stage in which the match was found was the last valid transaction in the pipeline and therefore the valid signal in all other following pipeline stages must already be "invalid". It may, nevertheless be necessary to ensure that the control circuitry 70 intervenes to ensure that the request valid signal received by the µTLB 16 does not enter the first pipeline stage, since when a match has been found this first pipeline stage will not be used (unless the match has been found in the second pipeline stage, in which case the valid signal for the first pipeline stage will indeed be forced high (or simply allowed to propagate the received request valid signal) but the enable signal in the first pipeline stage 24 will be forced low). Generally, the control circuitry 17 may be configured such that when the back-to-back signal is not asserted, it allows the enable signal to be propagated from one enable flop 76 to the next as long as the associated valid signal 72 is set.

As shown in FIG. 3, the µTLB 16 also comprises an MMU request interface 26 which is configured to provided an interface to the MMU 28. The MMU request interface 26 has a FIFO storage 82 which holds entries relating to each pending MMU request to be passed to the MMU 28. This allows the µTLB 16 to correctly administer these requests, preserving their ordering and ensuring that requests which are received at a rate faster than the µTLB or MMU can deal with them are nonetheless in due course correctly processed. For example, the MMU 28 may send requests or responses to the µTLB 16 such as for a line fill procedure to be carried out in one of the caches (which are effectively represented by the processing logic 80 in the respective pipeline stages in the illustrated embodiment) or for an invalidation process to be carried out, and so on. Conversely the µTLB 16 may send requests and messages to the MMU 28, for example page table requests (when the required page table information is not locally cached within the µTLB cache and translation pipeline 62), messages relating to faults, and so on.

Some information relating to the operation and content of the MMU request interface 26 is passed to the address comparison circuitry 20 and in particular to the enable control circuitry 84 provided therein. The enable control circuitry 84 is configured to dictate whether the comparator 64 is active or not, and there are situations in which it is advantageous for the comparator 64 to be switched off. One such situation is when the MMU 28 has issued a line fill or invalidation request to the µTLB 16, in which case it is recognised that the cached content within the µTLB 16 may not be reliably used for a subsequently received translation request and accordingly when the MMU request interface 26 indicates such a request has been received from the MMU 28, the enable control circuitry 84 disables the comparator 64. Also, the MMU request interface 26 is configured to send an indication of the occupancy level of the FIFO 82 to the enable control circuitry 84, in particular an indication of when this level has reached a predetermined threshold. This is because when the occupancy of the FIFO 82 reaches this predetermined threshold (i.e. when the FIFO 82 is nearly or completely full) it may be not be possible to guarantee that a slot in the MMU request FIFO 82 will be granted to a request issued by the µTLB cache and translation pipeline 62. To mitigate against this happening, the enable control circuitry 84 is also configured to disable the comparator 64 when this predetermined threshold has been reached. Similarly, the enable control circuitry 84 is also configured to receive a pipeline occupancy level indication from the µTLB cache and translation pipeline 62 (and in the illustrated embodiment in particular from the insertion circuitry 22 which can determine this occupancy on the basis of the settings of the respective valid signals in the respective pipeline stages) and when this pipeline occupancy level exceeds a predetermined threshold, perhaps in combination with the exceeding of the FIFO level threshold, the enable control circuitry 84 is configured to disable the comparator circuitry 64 to mitigate against a request issued by the µTLB cache and translation pipeline 62 not being granted a slot in the MMU request interface FIFO 82. It should further be noted that the µTLB cache and translation pipeline 62 is further configured, when one of the pipeline stages 24 indicates that the translation request it is processing cannot be completed (for example because a cache miss has occurred or because the access permissions retrieved indicate that the type of access to which the translation request pertains (as indicated by the "type" information received in association with the address portion) is not allowed for this physical address), to generate a translation response at its output which indicates that the nature of the failure (perhaps albeit temporary) of this translation request. Such a "replacement" translation response, and the associated circuitry required to be provided, is known to the skilled person and therefore omitted here for brevity of description.

Figure 4:
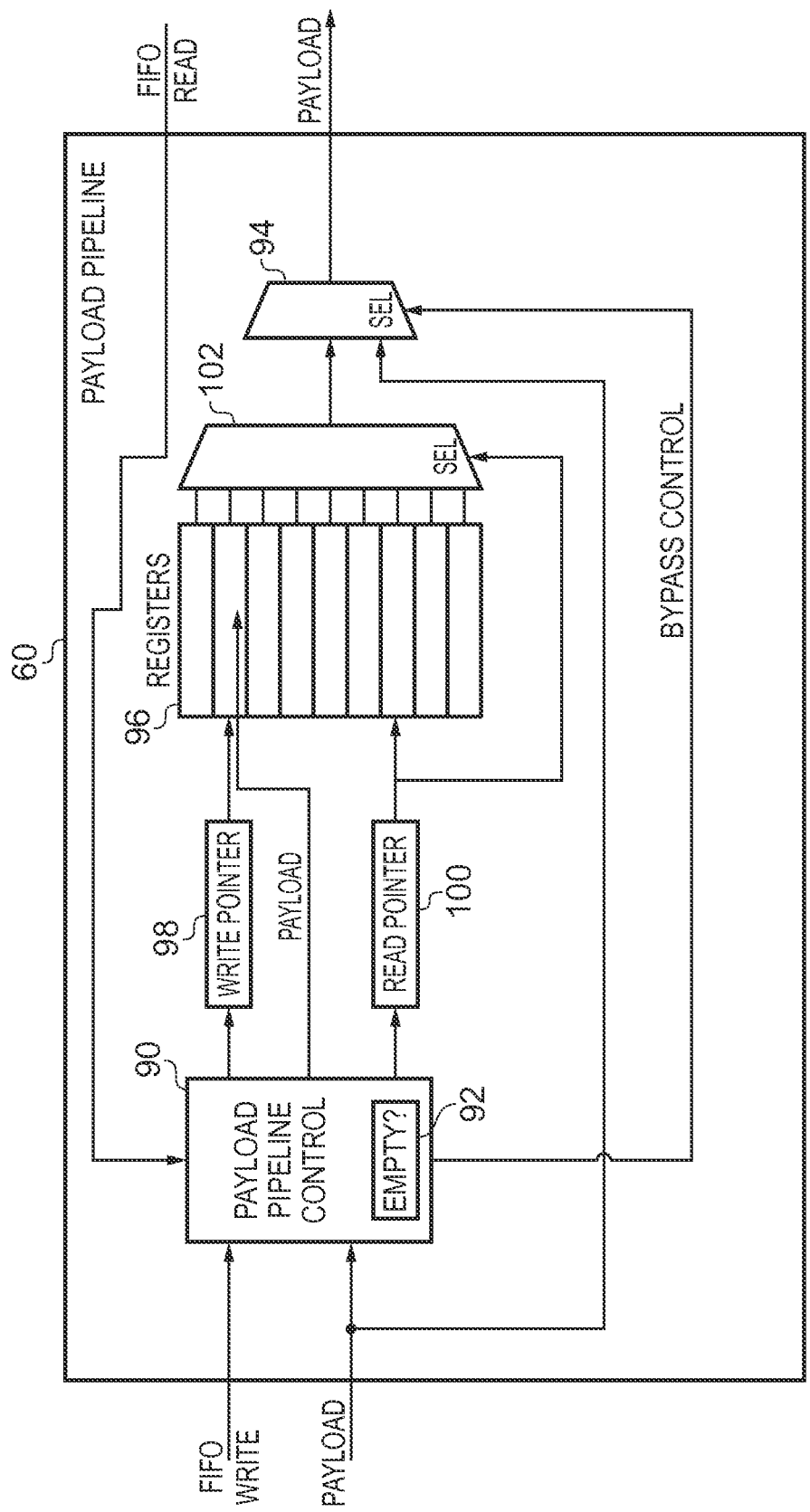
FIG. 4 schematically illustrates in more detail the payload pipeline of the address translation circuitry shown in FIG. 3.

FIG. 4 schematically illustrates in more detail the configuration of the payload pipeline 60 shown in FIG. 3. The FIFO write signal and the payload are initially received by payload pipeline control circuitry 90. Payload pipeline control circuitry 90 is first configured, by means of specific logic 92 provided for this purpose, to determine if the pipeline is currently empty. This can for example be done by reference to the write and read pointer 98, 100 which the payload pipeline control circuitry 90 maintains (e.g. when these coincide the pipeline is empty). If this is the case then there is no need for the payload to be buffered within the payload pipeline, and the logic 92 within the payload pipeline control circuitry 94 is configured to issue a bypass control signal to a bypass multiplexer 94 to select the payload data which is directly passed to it from the input of the payload pipeline 16 via a bypass path. If the pipeline is not currently empty then the payload data is written into a register entry of a set of registers 96, the particular entry into which the payload data should be written being indicated by a write pointer 98 which is maintained by the payload pipeline control circuitry 90. Once payload data has been written to a particular register entry the write point 98 is updated to the next register entry such that the set of registers 96 can operate in a FIFO fashion. Similarly, the payload pipeline control circuitry 90 maintains a read pointer 100 indicating the register entry of the set of registers 96 which should be read out from next i.e. also to support the FIFO configuration of this set of registers. The read pointer information is also passed to the selection input of an output multiplexer 102, such that the payload data stored in the register entry indicated by the read pointer can be read out. The payload pipeline control circuitry 90 also receives the FIFO read signal to enable it to administer reading of the registers 96. When a register entry of the set of registers 96 is being read out the payload pipeline control circuitry 90 also sets the bypass control selection signal for the bypass multiplexer 94 to select the input coming from the multiplexer 102 to provide as the payload output of the payload pipeline 60. Once a register entry indicated by the read pointer 100 has been read out, the payload pipeline control circuitry 90 is configured to update the read pointer to point to a next entry in the FIFO sequence. By providing the payload pipeline 60 with the FIFO structure of the above described configuration, the payload pipeline automatically supports the requirements of the address pipeline 62, in particular that the correct payload data accompanies the correct address data. This occurs by virtue of the fact that the above described "leap-frogging" where a received translation request effectively skips address translation pipeline stages does not disrupt the ordering of the content of the payload pipeline, because of its FIFO structure.

Figure 5:
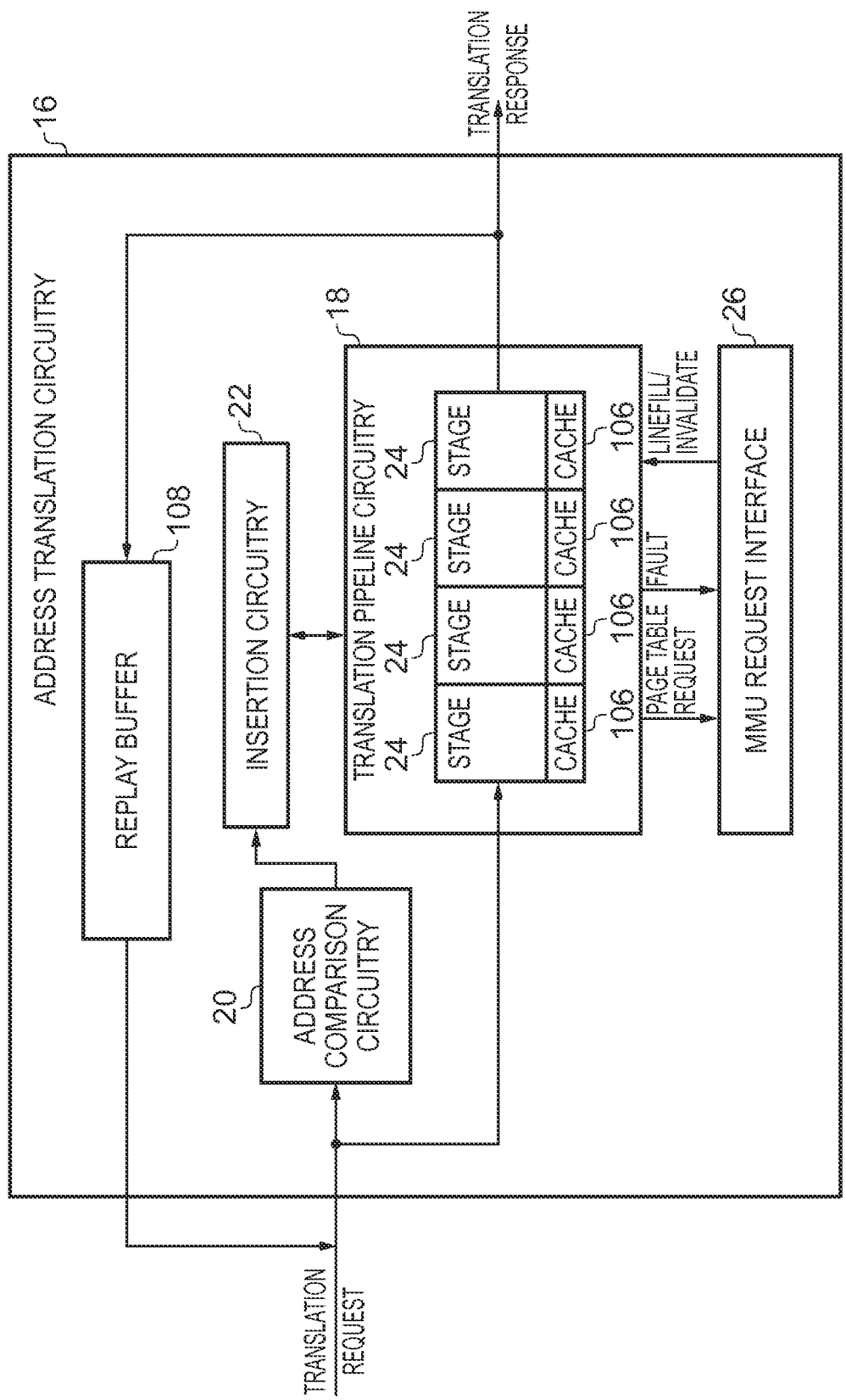
FIG. 5 schematically illustrates address translation circuitry in one embodiment.

FIG. 5 schematically illustrates particular details of the address translation circuitry (μTLB) 16 in a particular embodiment. The address comparison circuitry 20, the insertion circuitry 22 and the MMU request interface 26 are as described with reference to FIGS. 1 and 3 and are not described in further detail here. Note also that the address translation circuitry 16 may well comprise a payload pipeline such as item 60 illustrated in FIG. 3, but this is also omitted from this figure for clarity of illustration purposes only. Within the translation pipeline circuitry 18 the same pipeline stages 24 as previously illustrated and described are shown. FIG. 5 additionally illustrates that each pipeline stage 24 may be provided with access to a local cache 106 (for example a cache shared between the pipeline stages 24), which is configured to store local copies of data required to perform the address translation process, and as such these illustrated cache blocks 106 may for example comprise access to tag caches, data caches, permission data caches, and so on. When a cache miss occurs in one of the caches 106, the translation pipeline circuitry 18 is configured to issue a page table request to the MMU 28 (not shown in this figure for brevity) via the MMU request interface 26. The other particular aspect of the address translation circuitry 16 which is illustrated in FIG. 5 is the provision of a replay buffer 108. When a translation request is not able to be completed by the translation pipeline circuitry 18, for example due to a cache miss, as well as providing the (modified) translation response as described above, the request is also fed back to the input of the address translation circuitry 16, such that the requested translation can be attempted again. Further detail of the provision and administration of such a replay buffer 108 is familiar to the skilled person and for brevity is not described in detail here. However, it should be noted that the prevision of a replay buffer 108 is of particular benefit in the context of the present techniques (in which back-to-back matching translation requests are identified and efficiently dealt with) because it is in the nature of a replayed translation request that the likelihood of such a back-to-back scenario is increased. Accordingly, when such a translation request is repeated via the replay buffer 108, perhaps repeatedly and speculatively whilst for example the completion of a line fill is awaited, the repeated attempts to pass this translation request through the translation pipeline circuitry 18 does not result in all translation stages of the translation pipeline circuitry being activated, but rather when repeated the translation request can often skip to the pipeline stage which it had previously reached and failed at. For example in the context of a streaming TLB cache such as those provided in association with GPUs, the resulting latency and power saving can be of significant benefit.

Figure 6:
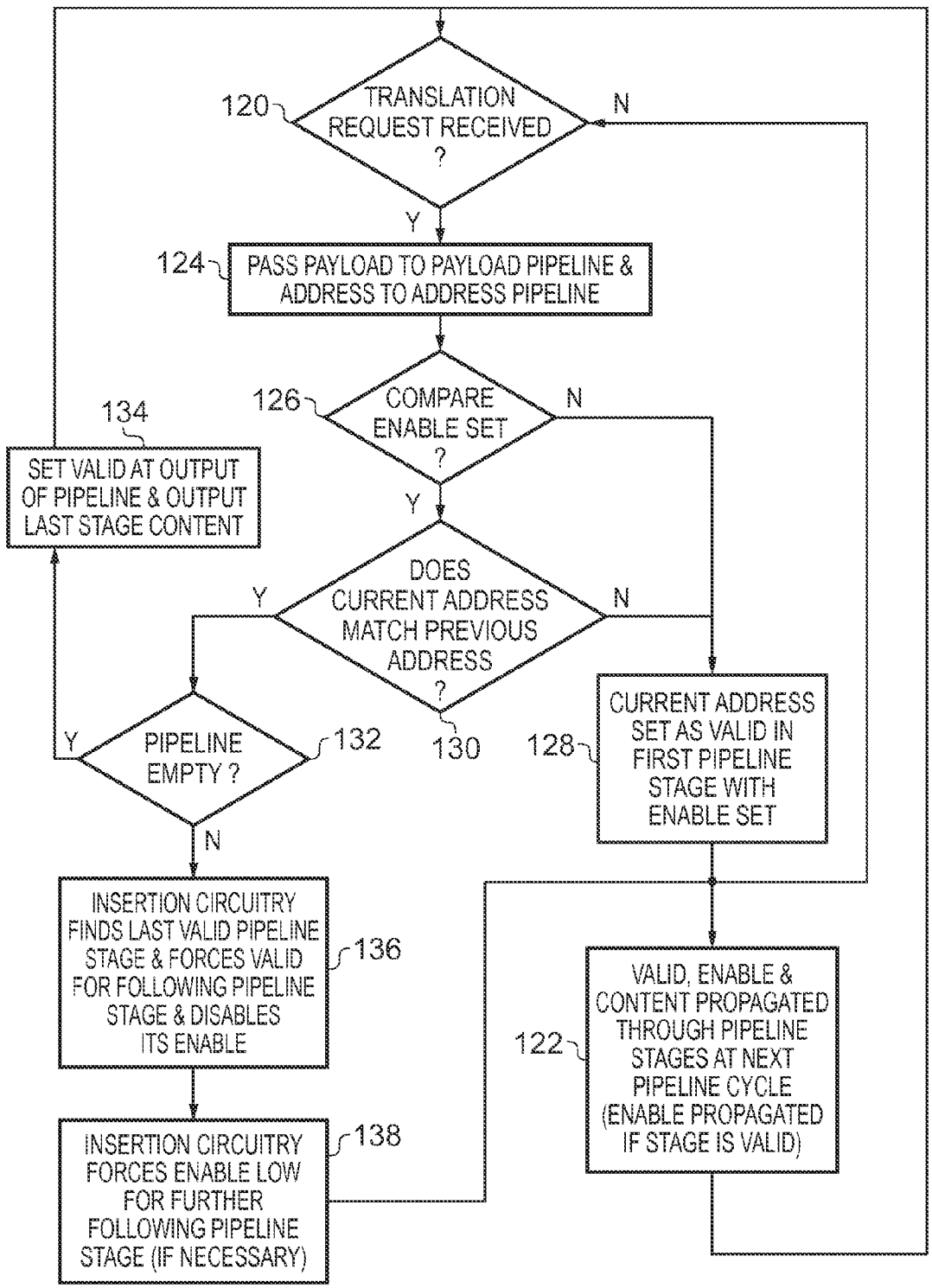
FIG. 6 schematically illustrates a sequence of steps which are taken by the address translation circuitry in one embodiment.

FIG. 6 schematically illustrates a sequence of steps which may be taken by address translation circuitry such as that illustrated in FIG. 3. The flow can be considered to begin at step 120 where it is determined if a translation request has been received. If it has not then the flow proceeds to step 122 where the insertion circuitry 22 allows the pipeline stages 24 to operate in their normal concatenated manner, in particular where the valid and enable signals and the register content are propagated normally through the pipeline stages at the next pipeline cycle (and as mentioned above this normal propagation may involve the enable signal being propagated for a particular stage if that stage has its associated valid signal set). The flow then returns to step 120 to determine if a translation request has been received. Once such a translation request has been received then the flow proceeds to step 124 where the payload portion of the translation request is passed to the payload pipeline 60 and the address portion is passed to the address pipeline 62. Then, at step 126 it is determined if the compare enable signal is currently set by the enable control circuitry 84. If it is not then the comparator 64 does not operate and the flow proceeds to step 128 where the current address (received in the newly received translation request) is set as valid in the first pipeline stage with the corresponding enable signal also set. The flow then proceeds to step 122 where normal propagation of the signals and content is carried out. If however at step 126 it is determined that the compare enable signal has been set by the enable control circuitry 84, then the flow proceeds to step 130, where it is determined whether the comparator 64 has found that the current address matches the previous address (as indicated by the content of the register 66 in the first pipeline stage). If it does not then the flow also proceeds via steps 128 and 122 as described above. However, when these addresses do match, and thus the "back-to-back" condition is met then the comparator 64 generates the back-to-back signal and passes this to the insertion circuitry 22. It is then determined by the insertion circuitry 22 if the pipeline is currently empty (at step 132), i.e. if no valid signals are currently set in any pipeline stages. If this is the case then (at step 134) the control circuitry 70 forces the valid signal at the output of the address pipeline to be valid and in association with this asserted valid signal at the output of the address pipeline causes the content of the last pipeline stage to be output at step 134. This is combined with the corresponding payload portion received in response to the assertion of the FIFO read signal (i.e. the valid signal at pipeline output) provided to the payload pipeline 60. Thereafter the flow returns to step 120. If however at step 132 it is determined that the pipeline is not currently empty then at step 136 the insertion circuitry 22 finds the last valid pipeline stage and forces the valid signal to be asserted for the following pipeline stage as well as disabling the enable signal for that following pipeline stage. Then at step 138 the insertion circuitry 22 forces the enable signal low for any further following pipeline stages (i.e. pipeline stages further left in the FIG. 3 illustration) to clock-gate the registers and processing logic 80 in these pipeline stages. Thereafter the flow proceeds to step 122 where the resulting valid and enable signals are allowed to propagate through the pipeline stages at the next pipeline cycle, it being understood that the forcing of the valid and enable signals at step 136 and 138 will ensure in particular that the of content later pipeline stages will in fact not be propagated. The flow then returns to step 120.

Figure 7:
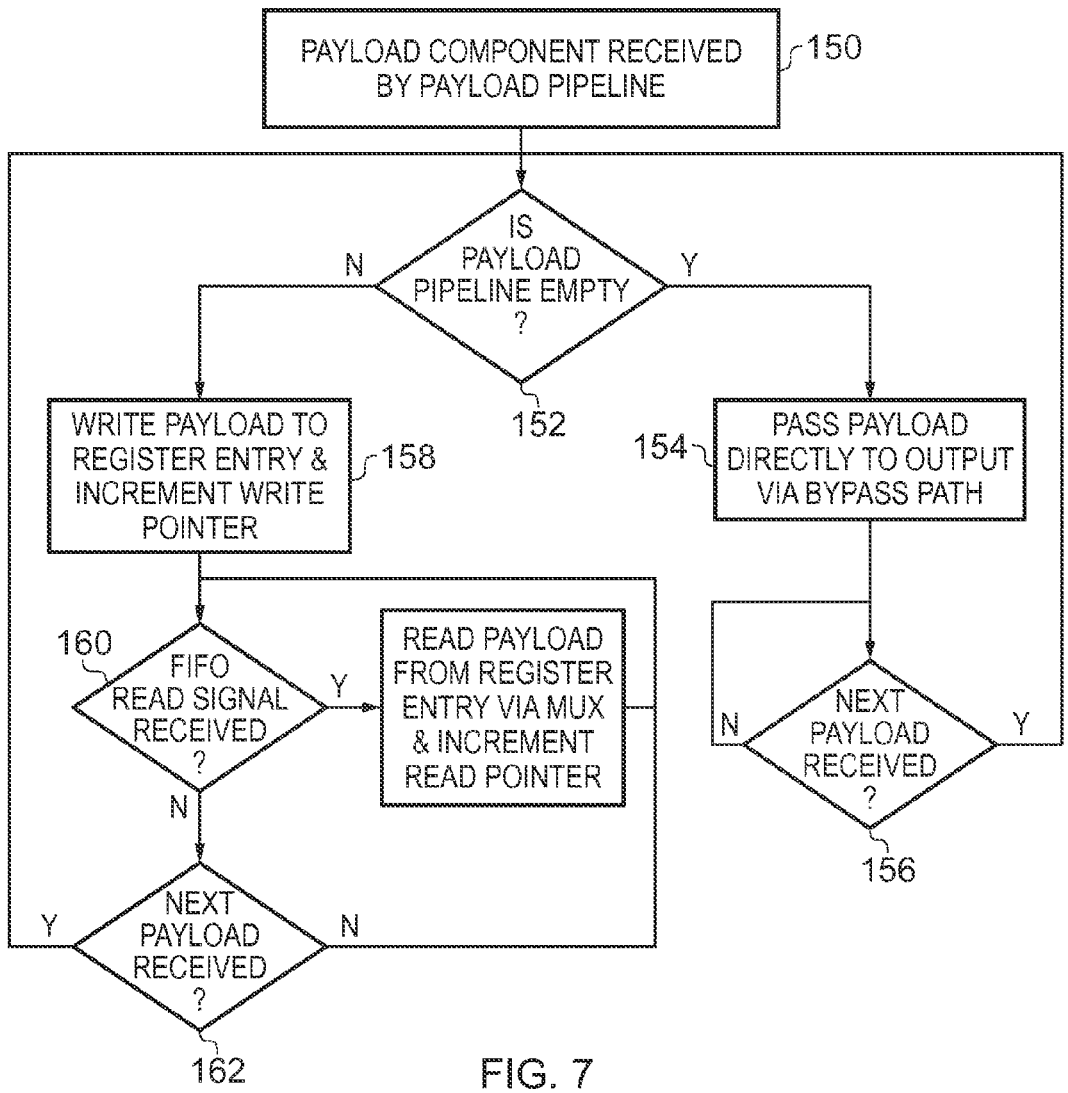
FIG. 7 schematically illustrates a sequence of steps which are taken by the payload pipeline in one embodiment.

FIG. 7 schematically illustrates a series of steps which may be taken in the operation of a payload pipeline 60 such as that illustrated in FIG. 4. The flow begins at step 150, where a payload component of a translation request is received by the payload pipeline. Then, at step 152, it is determined (by the logic 92 in the payload pipeline control circuitry 90), if the payload pipeline is currently empty. If it is, then the flow proceeds to step 154 where the payload content is passed directly to the output of the payload pipeline via the bypass path (and appropriate setting of the bypass control signals by the payload pipeline control 90). Thereafter it is determined at step 156 if a next payload has been received by the payload pipeline 60 and until this is the case the flow loops on itself at step 156. Once a next payload is received then the flow proceeds from step 152 again. When at step 152 it is determined that the payload pipeline is not empty then the flow proceeds to step 158 where the newly received payload component is written into a register entry of the registers 96 as indicated by the write pointer 98 and the payload pipeline control 90 then increments the write pointer 98 to the next register entry in the FIFO sequence. Then at step 160 it is determined if the FIFO read signal has been received. If it has then the payload content is read from the register entry of the set of registers 96 indicated by the read pointer 90 via the multiplexer 92 and thereafter the read pointer 100 is incremented to the next register entry in the FIFO sequence. The flow then returns to step 160 to determine if another FIFO read signal has been received. When at step 160 no FIFO read signal is currently asserted then the flow proceeds to step 162 where it is determined if a next payload has been received by the payload pipeline 60. Whilst such a payload is not received then the flow loops back to step 160 to service a FIFO read signal assertion if required. Once a next payload has been received, then the flow returns to step 152.

Although a particular embodiment has been described herein, it will be appreciated that the invention is not limited thereto and that many modifications and additions thereto may be made within the scope of the invention. For example, various combinations of the features of the following dependent claims, even if not explicitly set out in the claim dependencies, could be made with the features of the independent claims without departing from the scope of the present invention.

The invention claimed is:

1. Address translation circuitry configured to receive a first address used in a first addressing system and to translate the first address into a second address used in a second addressing system, wherein the address translation circuitry comprises:

translation pipeline circuitry comprising plural pipeline stages, the plural pipeline stages configured to translate the first address into the second address over the course of the plural pipeline stages;

address comparison circuitry configured to identify an address match condition when a received first address at least partially matches a previously received first address; and insertion circuitry configured to determine a stage of progress of the previously received first address in the plural pipeline stages and to cause content of the stage of progress of the previously received first address to be unchanged at a next pipeline cycle when the address comparison circuitry identifies the address match condition, wherein the first address is accompanied by an indication of a request type of a corresponding memory access request and the plural pipeline stages are configured, when permission data associated with a translation of the first address into the second address indicate that the translation is not allowed for the request type, to seek to translate the first address into the second address, but not to pass the second address to an output of the address translation circuitry, and to generate a fault response.

2. The address translation circuitry as claimed in claim 1, wherein each pipeline stage of the plural pipeline stages comprises a register configured to hold content which is subject to address translation processing for that pipeline stage, wherein the register is clock-gated in dependence on an enable signal for that pipeline stage, and wherein the insertion circuitry is configured to force the enable signal to clock-gate the register to be static in pipeline stages ordered after the stage of progress of the previously received first address when the address comparison circuitry identifies the address match condition.

3. The address translation circuitry as claimed in claim 2, wherein each pipeline stage of the plural pipeline stages is configured to propagate a valid signal, wherein said valid signal indicates that the content of that pipeline stage is valid, and wherein the insertion circuitry is configured determine the stage of progress of the previously received first address in the plural pipeline stages by finding a last pipeline stage where the valid signal is set as valid.

4. The address translation circuitry as claimed in claim 3, wherein the insertion circuitry is configured to force the valid signal to be valid in the pipeline stage ordered immediately after the stage of progress of the previously received first address when the address comparison circuitry identifies the address match condition.

5. The address translation circuitry as claimed in claim 1, wherein the address comparison circuitry is configured to identify the address match condition with reference to an indication of the previously received first address stored in a first pipeline stage of the plural pipeline stages.

6. The address translation circuitry as claimed in claim 1, further comprising a memory management unit request interface configured to receive requests from a memory management unit.

7. The address translation circuitry as claimed in claim 1, wherein the address translation circuitry forms part of a memory management unit and further comprises an interface configured to interact with a page table walk engine of the memory management unit.

8. The address translation circuitry as claimed in claim 6, wherein the memory management unit request interface comprises a FIFO buffer configured to store pending requests received from the memory management unit.

9. The address translation circuitry as claimed in claim 1, wherein the address comparison circuitry further comprises enable circuitry, the enable circuitry configured to suppress operation of the address comparison circuitry when a suppression condition is met.

10. The address translation circuitry as claimed in claim 1, further comprising a memory management unit request interface configured to receive requests from a memory management unit, wherein the suppression condition is met when the request received from the memory management unit is at least one of:
a linefill request; and
an invalidation request.

11. The address translation circuitry as claimed in claim 1, wherein the address translation circuitry forms part of a memory management unit and further comprises an interface configured to interact with a page table walk engine of the memory management unit, wherein the suppression condition is met when the memory management unit carries out at least one of:
a linefill request; and
an invalidation request.

12. The address translation circuitry as claimed in claim 1, wherein the memory management unit request interface comprises a FIFO buffer configured to store pending requests received from the memory management unit, wherein the suppression condition is met when at least one of the following conditions is met:
the memory management unit indicates that occupancy of the FIFO buffer has reached at least a predetermined threshold; and
the translation pipeline circuitry indicates that at least a predetermined number of the plural pipeline stages are currently actively performing address translations.

13. The address translation circuitry as claimed in claim 1, comprising an address pipeline and a payload pipeline, wherein the address pipeline comprises the address translation circuitry, the translation pipeline circuitry, and the insertion circuitry,
and an address portion of the first address is passed to the address pipeline and a payload portion of the first address is passed to the payload pipeline,
wherein the payload portion of the first address is not changed by translation of the first address into the second address.

14. The address translation circuitry as claimed in claim 13, wherein the payload pipeline comprises registers arranged as a FIFO structure.

15. The address translation circuitry as claimed in claim 14, wherein the registers of the payload pipeline are configured as a pointer based FIFO structure.

16. The address translation circuitry as claimed in claim 13, wherein the payload pipeline comprises a bypass path configured to pass the payload portion directly to an output of the payload pipeline when the payload pipeline is currently empty.

17. The address translation circuitry as claimed in claim 1, wherein the plural pipeline stages are configured to seek to translate the first address into the second address with reference to at least one cache storage configured to store indications of previously performed first to second address translations, and further comprising a replay buffer configured to temporarily hold an indication of the first address before returning it to an input of the address translation circuitry for translation of the first address into the second address to be reattempted when a cache look up in the at least one cache storage results in a cache miss.

18. Address translation circuitry configured to receive a first address used in a first addressing system and to translate the first address into a second address used in a second addressing system, the address translation circuitry comprising:
means for translating the first address into the second address over the course of plural pipeline stages;
means for identifying an address match condition when a received first address at least partially matches a previously received first address;
means for determining a stage of progress of the previously received first address in the plural pipeline stages; and
means for causing the content of the stage of progress of the previously received first address to be unchanged at a next pipeline cycle when the address match condition is identified,
wherein the first address is accompanied by an indication of a request type of a corresponding memory access request and the address translation circuitry further comprises, when permission data associated with a translation of the first address into the second address indicate that the translation is not allowed for the request type;
means for seeking to translate the first address into the second address, but not passing the second address to an output of the address translation circuitry, and generating a fault response.

19. A method of translating a first address used in a first addressing system into a second address used in a second addressing system, the method comprising the steps of:
translating the first address into the second address over the course of plural pipeline stages;
identifying an address match condition when a received first address at least partially matches a previously received first address;
determining a stage of progress of the previously received first address in the plural pipeline stages; and
causing the content of the stage of progress of the previously received first address to be unchanged at a next pipeline cycle when the address match condition is identified,
wherein the first address is accompanied by an indication of a request type of a corresponding memory access request and the method further comprises:
when permission data associated with a translation of the first address into the second address indicate that the translation is not allowed for the request type, seeking to translate the first address into the second address, but not passing the second address to an output, and generating a fault response.

\* \* \* \* \*